United States Patent
Skaria et al.

(10) Patent No.: US 8,195,700 B2
(45) Date of Patent: Jun. 5, 2012

(54) DISTRIBUTED STORAGE FOR COLLABORATION SERVERS

(75) Inventors: Simon Skaria, Sammamish, WA (US); Andrew Sean Watson, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 330 days.

(21) Appl. No.: 11/863,382

(22) Filed: Sep. 28, 2007

(65) Prior Publication Data

US 2009/0089341 A1 Apr. 2, 2009

(51) Int. Cl.
*G06F 7/00* (2006.01)
(52) U.S. Cl. .................................. 707/795; 707/827
(58) Field of Classification Search .............. 714/15; 709/201–207
See application file for complete search history.

(56) References Cited

U.S. PATENT DOCUMENTS

| | | | | |
|---|---|---|---|---|
| 5,987,506 A * | 11/1999 | Carter et al. | | 709/213 |
| 6,065,013 A * | 5/2000 | Fuh et al. | | 1/1 |
| 6,202,070 B1 * | 3/2001 | Nguyen et al. | | 707/104.1 |
| 6,625,624 B1 | 9/2003 | Chen et al. | | |
| 6,728,737 B2 * | 4/2004 | Wollrath et al. | | 707/206 |
| 6,912,573 B2 | 6/2005 | Ohkado et al. | | |
| 6,928,476 B2 | 8/2005 | Bucher | | |
| 2003/0200234 A1 * | 10/2003 | Koppich et al. | | 707/203 |
| 2003/0225801 A1 * | 12/2003 | Devarakonda et al. | | 707/205 |
| 2004/0019640 A1 * | 1/2004 | Bartram et al. | | 709/205 |
| 2004/0148308 A1 * | 7/2004 | Rajan et al. | | 707/102 |
| 2005/0097440 A1 | 5/2005 | Lusk | | |
| 2005/0289152 A1 * | 12/2005 | Earl et al. | | 707/100 |
| 2006/0294571 A1 * | 12/2006 | Moore et al. | | 725/135 |
| 2007/0073731 A1 * | 3/2007 | Reimer et al. | | 707/10 |
| 2007/0083592 A1 | 4/2007 | Bartram | | |
| 2008/0104081 A1 * | 5/2008 | Mimatsu | | 707/10 |
| 2008/0126404 A1 * | 5/2008 | Slik et al. | | 707/103 R |
| 2008/0140941 A1 * | 6/2008 | Dasgupta et al. | | 711/137 |

FOREIGN PATENT DOCUMENTS

EP 1 503 311 A1 2/2005

OTHER PUBLICATIONS

Collaboration Key to Distributed Data Oversight, *Above the Cloud*; James Kobielus et al., Network World, Jul. 24, 2006 (2 pgs.); http://www.networkworld.com/columnists/2006/072406kobielus.html?page=1.

* cited by examiner

*Primary Examiner* — Vei-Chung Liang
(74) *Attorney, Agent, or Firm* — Merchant & Gould PC

(57) ABSTRACT

Distributed storage of collaboration data is managed over internal and external data stores in a collaboration service environment based on categorization of the data. The categorization may be based on type of data (e.g. structured vs. unstructured), how the data is accessed, an expected storage life for the data, back-up requirements, and the like. Data that can be stored externally according to its category is then directed to the external storage through a storage provider. A unique identifier associated with the location of the externally stored data is saved in one of the internal data stores for seamless retrieval of data in a transparent manner to the user.

18 Claims, 5 Drawing Sheets

DISTRIBUTED STORAGE FOR COLLABORATION SERVERS

BACKGROUND

Collaboration servers handle wide varieties and large amounts of data for participants of a collaboration service and typically store data in a single storage substrate like a Sequential Query Language (SQL) server. This behavior may result in resource bottlenecks, poor scalability, and high cost for data storage. In situations where the deployments include large amounts of data such as tens of terabytes of files, the challenge of managing data storage for collaboration services becomes even more significant.

Furthermore, different types of data such as structured data or unstructured data ("blob") may be processed and accessed differently by the storage and processing systems with varying overhead requirements. If one type of data does not require the same overhead for processing or is not accessed in the same way as another type, subjecting both types to the same treatment may result in wasted resources and increased cost of managing the storage of the data.

SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments are directed to storing data in a collaboration environment in a distributed manner based on categorization of the data. The categorization may be based on type of data (e.g. structured vs. unstructured), how the data is accessed, an expected storage life for the data, back-up requirements, and the like. By directing data to suitable storage based on the determine categories, usage of system resources, cost of storage, and scalability of the system may be optimized.

These and other features and advantages will be apparent from a reading of the following detailed description and a review of the associated drawings. It is to be understood that both the foregoing general description and the following detailed description are explanatory only and are not restrictive of aspects as claimed.

DETAILED DESCRIPTION

As briefly described above, data may be stored in a distributed manner in a collaboration environment based on categorization of the data, where the categorization may be based on type of data, how the data is accessed, an expected storage life for the data, back-up requirements, and the like. In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While the embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and the like. Embodiments may also be practiced in distributed computing environments where tasks are performed by remote processing devices that are linked through a communications network. In a distributed computing environment, program modules may be located in both local and remote memory storage devices.

Embodiments may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

Figure 1:
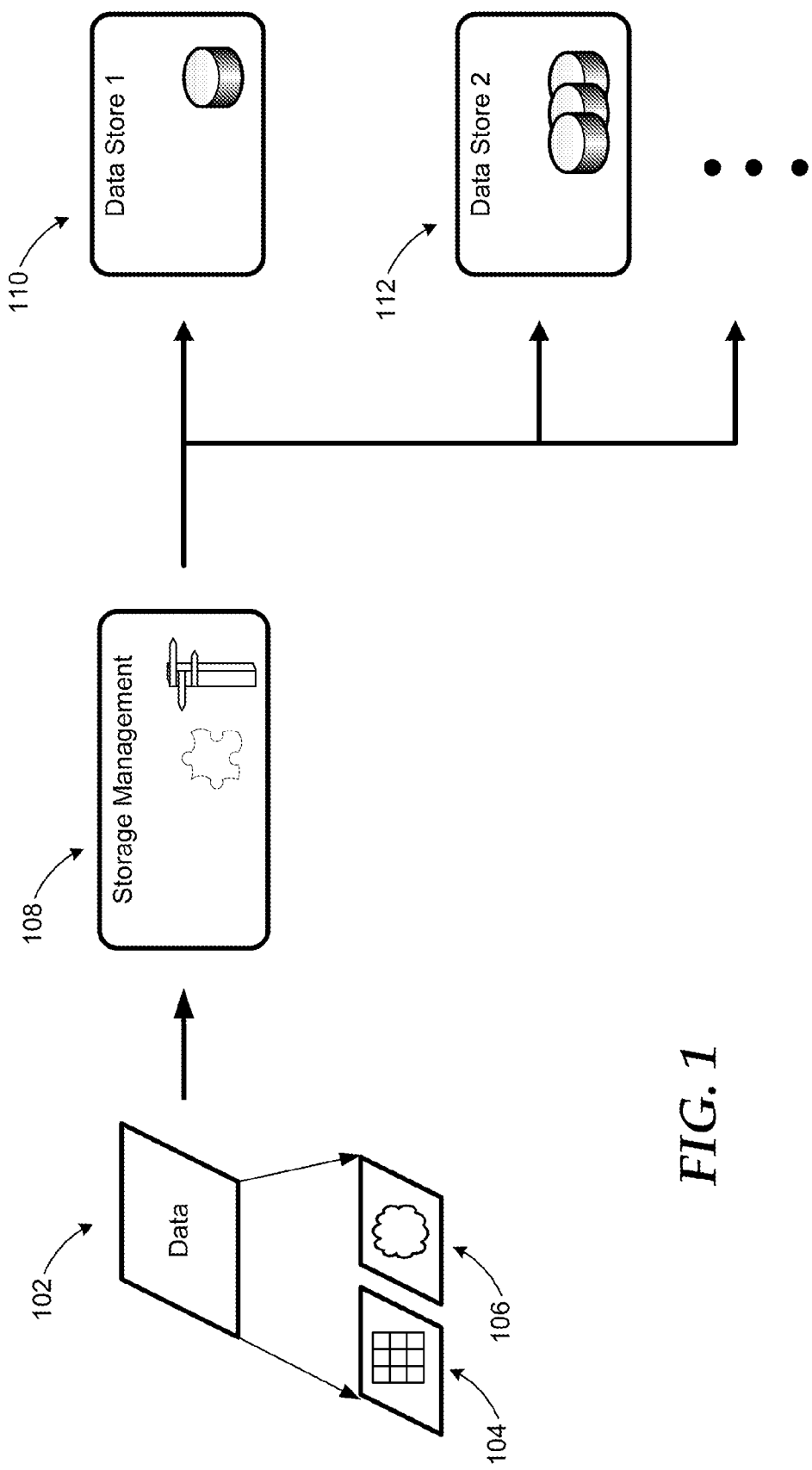
FIG. 1 is a conceptual diagram illustrating management of data storage through distributed storage coordinating multiple data stores of different types.

Referring to FIG. 1, a conceptual diagram illustrating management of data storage through distributed storage coordinating multiple data stores of different types is shown. Data that may be stored in a system according to embodiments may include data of any form such as textual data, files, video stream, audio stream, images, and the like. The content may also include a pointer to data that is stored in another system.

As discussed above, storage of data in a collaboration service may be inefficient and costly if all data is treated the same way and stored in single type storage facilities such as an SQL database. On the other hand, being able to distribute the storage of collaboration data by storing the different types of the data in data stores with different attributes may be advantageous for low resource contention, better scalability, and better cost characteristics. In such a system, the data may be categorized based on predefined criteria such as the data being structured or unstructured, how the data is accessed, whether redundancy checks are performed, a backup frequency required for the stored data, an expected storage life for the stored data, and the like. Additional criteria include, but are not limited to, required security attributes for stored data, frequency of updates, and an encryption status of the stored data. For example, structured data may be stored in an SQL server and unstructured data in less expensive (from a system resource perspective) storage through a resource manager of the provider's choice.

In a system according to one embodiment, a redirection is built in the collaboration object model by querying the structured data storage for storage keys to the unstructured storage. Subsequently, the storage key for unstructured storage is used to identify, access, and potentially update the corresponding unstructured data (e.g. stream). At the integration level, embodiments provide the ability for any remote unstructured data (blob) store to participate in externalizing blob storage by implementing a set of interfaces. As a result, it may be possible to better stream content out of a blob store in cases where the required capabilities may not be supported by a structured data store (e.g. an SQL Server). In addition, a capability to garbage collect orphaned data streams in the remote blob store may be built in by differentiating orphans from those actively supporting live content in the structured data server.

When new data arrives at the collaboration server for storage, the storage provider interface is called out to determine whether the data can be stored in an external repository before the data is committed to structured data storage. The interface returns a blob identifier if the data is not structured and can be stored in a remote data store without the overhead of structured data storage. Instead of the blob stream, the collaboration server may store this blob identifier in the structured database. When a file that includes the blob needs to be accessed, the blob manager may fetch the blob identifier from the structured database and invoke a binary retrieval method on the provider interface. That way, the unstructured data portion of the stored file can be stored at unstructured data storage without the overhead of the structured data storage and accessed in a transparent manner to the user.

The storage provider may hand the collaboration server back a unique identifier for the data which was just stored (through the storage provider interface). This identifier may come from the external storage device directly. If the device does not create its own identifiers, the provider may generate a GUID to hand to both the device and collaboration server.

Following is an example storage provider interface:

```
library CollaborationServiceBinaryStore
{
    [
        local,
        object,
        uuid(48036587-c8bc-4aa0-8694-5a7000b4ba4f),
        helpstring("ISPExternalBinaryProvider interface")
    ]
    interface ISPExternalBinaryProvider : IUnknown
    {
        HRESULT StoreBinary(
            [in] unsigned long cbPartitionId,
            [in, size_is(cbPartitionId)] const byte* pbPartitionId,
            [in] ILockBytes* pilb,
            [out] unsigned long* pcbBinaryId,
            [out, size_is(, *pcbBinaryId)] byte** ppbBinaryId,
            [out, optional] VARIANT_BOOL* pfAceepted);
        HRESULT RetrieveBinary(
            [in] unsigned long cbPartitionId,
            [in, size_is(cbPartitionId)] const byte* pbPartitionId,
            [in] unsigned long cbBinaryId,
            [in, size_is(cbBinaryId)] const byte* pbBinaryId,
            [out] ILockBytes** ppilb);
    }
}
``` where pilb is a pointer to the blob as ILockBytes; cbparitionId is the size of the byte array passed to pbParitionId; pbPartitionId is the identifier of the site where the document belongs and can be used by the provider for mapping the blob identifier to logical collections within the blob store; ppbBinaryId is an out parameter from the provider after the blob is stored in the blob store; pcbBinaryId is the number of bytes in the blob identifier; and pfAccepted is an out Boolean parameter whose value of FALSE indicates to the collaboration server that the blob should be stored inline.

Following the example interface above, an example method on the ISPExternalStorageProvider to add files to the repository is StoreBinary:

```
HRESULT StoreBinary(
    [in] unsigned long cbPartitionId,
    [in, size_is(cbPartitionId)] const byte* pbPartitionId,
    [in] ILockBytes* pilb,
    [out] unsigned long* pcbBinaryId,
    [out, size_is(, *pcbBinaryId)] byte** ppbBinaryId,
    [out, optional] VARIANT_BOOL* pfAceepted);
```

When a user wants to access a file from the storage, the collaboration server may use the example RetrieveBinary below on ISPExternalStorageProvider:

```
HRESULT RetrieveBinary(
    [in] unsigned long cbPartitionId,
    [in, size_is(cbPartitionId)] const byte* pbPartitionId,
    [in] unsigned long cbBinaryId,
    [in, size_is(cbBinaryId)] const byte* pbBinaryId,
    [out] ILockBytes** ppilb);
```

In a system according to embodiments, data 102 may include one or both of structured data 104 and unstructured data (blob) 106. Upon arrival of the data 102 at the storage management application 108 of the collaboration service (typically residing on a collaboration server), a determination may be made whether the unstructured portion of the data is to be stored in external storage such as data store 2 112. External storage may be used for less overhead requiring data that may not need to be processed by a structured data server such as an SQL server. Such storage facilities may be managed by an external storage provider service (not shown). Furthermore, a garbage collection module or application may be employed to optimize storage and retrieval of unstructured data based on a selected deletion management scheme.

Data store 1 (110) may be used to store structured portion of the data and be directly managed by the collaboration server. Embodiments are not limited to storing data based on whether the data is structured or not. According to some embodiments, the storage facility for the collaboration data may be selected based on categorization of the received data. The categorization may be based on any one of the criteria listed above or additional criteria. For example, data requiring frequent updates and/or increased security measures may be stored in an internal data store (e.g. data store 1), while data that does not require frequent updates or requires relatively lesser security measures may be stored in an external data store. When a portion of the data from the same file or document is stored in an external data store managed by an external storage provider, the identifiers discussed above may be used to indicate where the data is stored in the internal database such that the whole file or document can be retrieved when a request for access is received.

Components of a distributed storage management system in a collaboration environment may be executed over a distributed network, in individual servers, in a client device, and the like. Furthermore, the components described herein are for illustration purposes only, and do not constitute a limitation on the embodiments. A distributed storage management system in a collaboration environment may be implemented using fewer or additional components in various orders. Individual components may be separate applications, or part of a single application. Moreover, the system or its components may include individually or collectively a user interface such as a web service, a Graphical User Interface (GUI), and the like.

Figure 2:
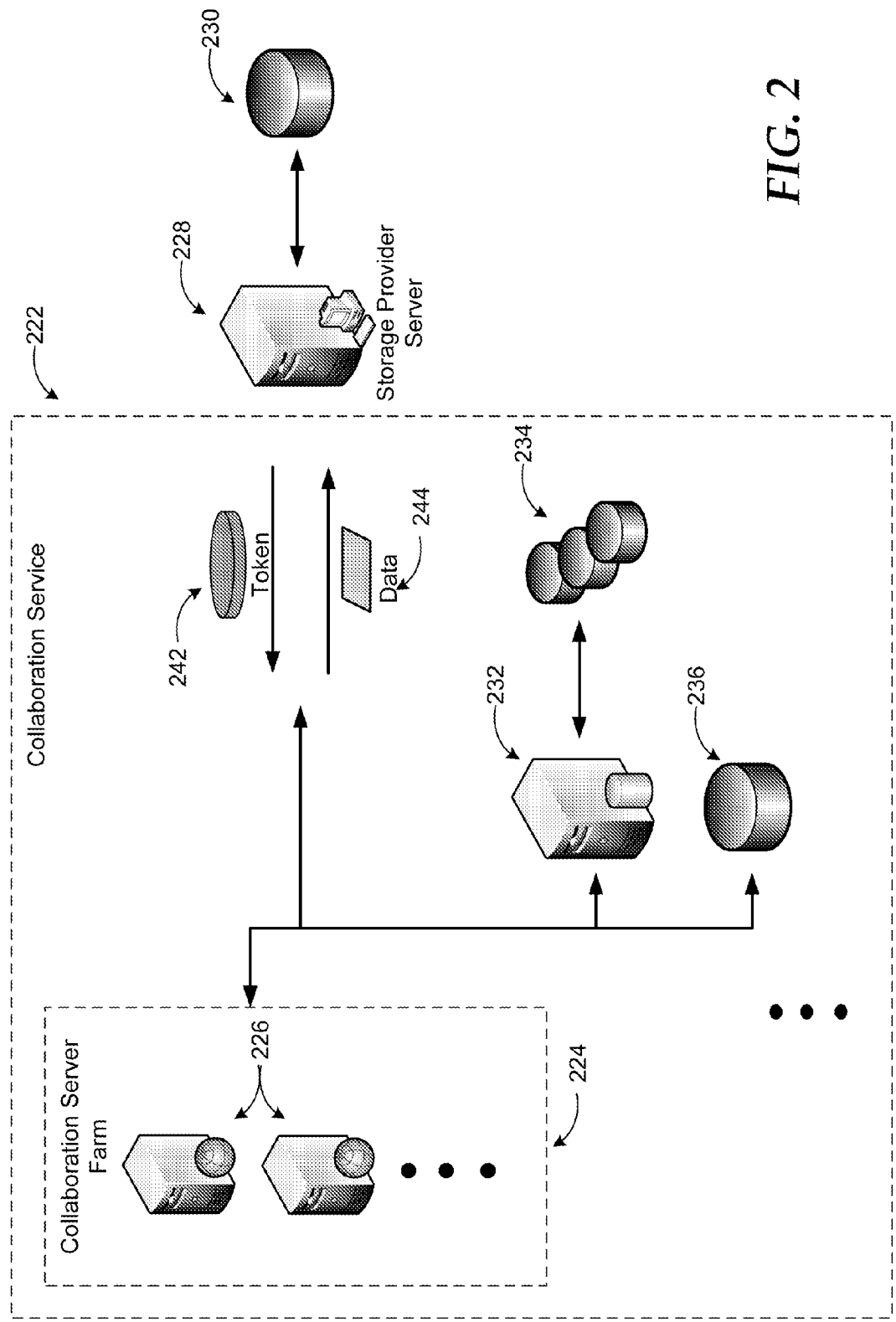
FIG. 2 illustrates an example collaboration service storing data in a distributed manner over a variety of storage facilities.

FIG. 2 illustrates an example collaboration service storing data in a distributed manner over a variety of storage facilities. A collaboration service 222 typically includes one or more collaboration servers 226 in a collaboration server farm 224 for managing collaboration data. As discussed above, received data may be stored in different storage facilities based on categorization of the data. For example, collaboration servers 226 may direct the data to internal data stores 234 for structured data managed by database server 232 (e.g. an SQL server) or to data store 236 directly managed by one or more of the collaboration servers 226.

Data that can be stored in an external data store (e.g. data store 230) due to the category of the data such as the data being unstructured, the data having a low frequency of updates, or the data being encrypted. In that case, the collaboration servers 226 may communicate with the storage provider server 228 providing the data 244 and receiving a token 242 (identifier) such that a location of the externally stored data can be saved in the local structured data store for subsequent retrieval.

Deletions of data in a system according to embodiments may be handled employing a variety of options such as lazy garbage collection, never deleting data from the external data store, or notification of the storage provider when a portion is deleted. The latter may be quite complicated since new notions of events which enumerate all the objects which they act upon would have to be created. Never deleting from the blob store is similar to a degenerate garbage collection. Garbage collection is a method of memory/data store management. By making manual memory deallocation unnecessary, garbage collection frees the system from having to worry about releasing objects and/or stored data that are no longer needed.

A system according to one embodiment may support a lazy garbage collection scheme for orphaned files. Once the collaboration servers 226 no longer contain any reference to a file (including active documents, old versions, recycle bin documents) it can then be removed from the external data store. A long running timer job may be implemented by the storage provider server 228 for garbage collection. Garbage collection for orphan blobs in the external storage may be performed in three steps: enumerate all blobs in the external store; enumerate all blob references in the collaboration server(s); and remove all blobs in the external store for which there is no corresponding blob reference in the collaboration server(s).

A distributed storage service according to embodiments may be implemented with additional or fewer components and processes than those described above in conjunction with the example system. A collaboration service may include any number of servers and data stores. Such a service may utilize any number and type of external storage providers and external stores. Furthermore, additional methods may be employed to optimize the system's operation instead of or in addition to the example garbage collection method described for managing deletion of externally stored data.

Figure 3:
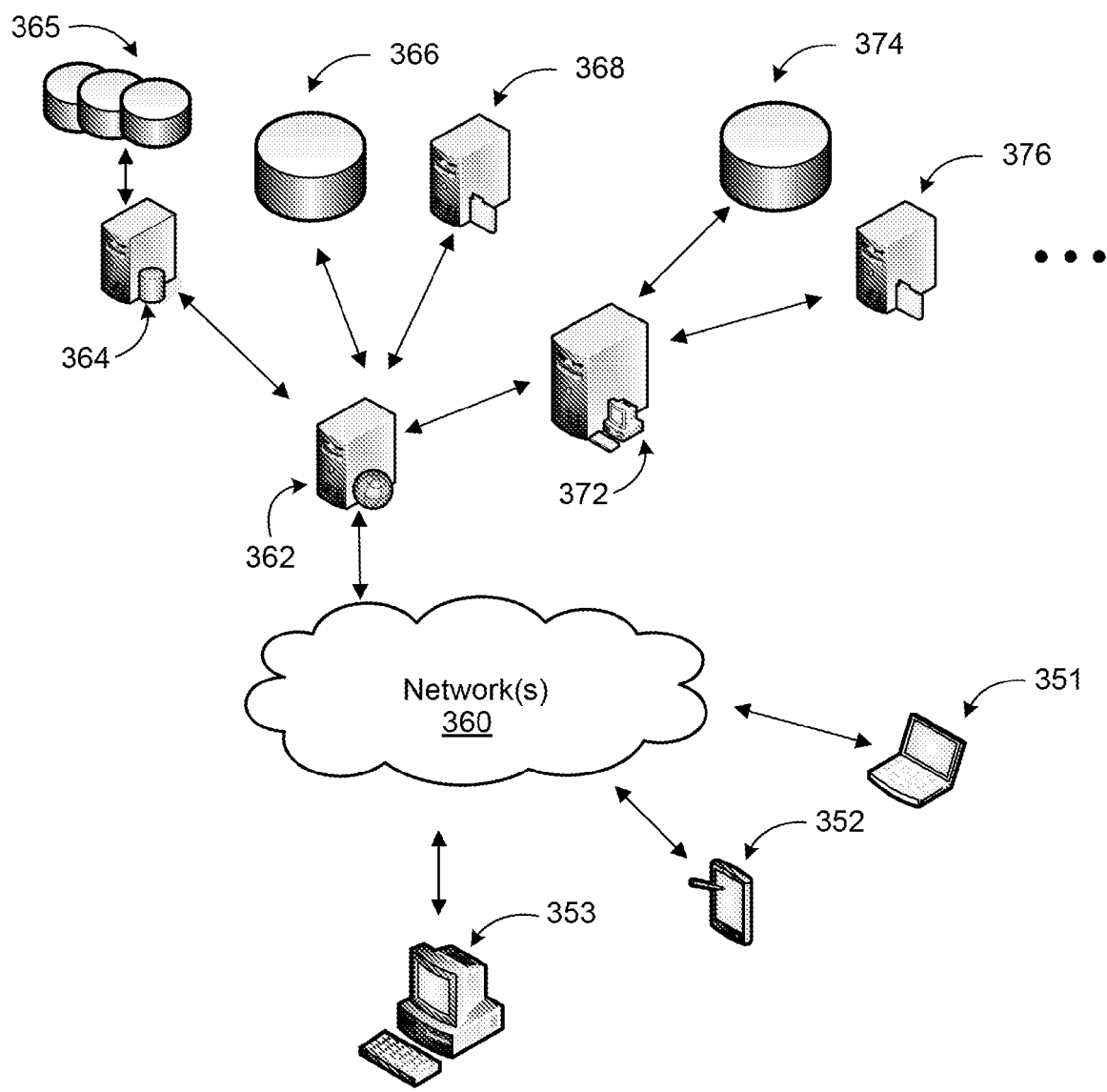
FIG. 3 is an example networked environment, where embodiments may be implemented.

FIG. 3 is an example networked environment, where embodiments may be implemented. Distributed storage for collaboration servers may be implemented in one or more computing devices configured in a distributed manner over a number of physical and virtual clients and servers. It may also be implemented in un-clustered systems or clustered systems employing a number of nodes communicating over one or more networks (e.g. network(s) 360).

Such a system may comprise any topology of servers, clients, Internet service providers, and communication media. Also, the system may have a static or dynamic topology, where the roles of servers and clients within the system's hierarchy and their interrelations may be defined statically by an administrator or dynamically based on availability of devices, load balancing, and the like. The term "client" may refer to a client application or a client device. While a networked system implementing distributed storage for collaboration servers repositories may involve many more components, relevant ones are discussed in conjunction with this figure.

A collaboration service according to embodiments may be hosted by one or more server such as collaboration server 362. Users may access the collaboration service from client devices 351-353 through network(s) 360 and upload or download data, which may include structured or unstructured data, and data with differing attributes such as those described above as the criteria for categorization of the collaboration data.

Collaboration server 362 may store and retrieve data through internal storage means such as data stores 365 managed by database server 364, structured data store 366, and file server 368. For data that can be stored externally depending on their category, collaboration server 362 may communicate with storage provider server 372, which may store the data in data store 374, file server 376, or other storage means. In addition to determining a category of the collaboration data, storing a portion in external storage, and saving an identifier for the location of externally stored data in the internal data stores, collaboration server 362 may also manage a quota and object level administration for the distributed storage.

Network(s) 360 may include a secure network such as an enterprise network, an unsecure network such as a wireless open network, or the Internet. Network(s) 360 provide comiunication between the nodes described herein. By way of example, and not limitation, network(s) 360 may include wired media such as a wired network or direct-wired connection, and wireless media such as acoustic, RF, infrared and other wireless media.

Many other configurations of computing devices, applications, data sources, data distribution systems may be employed to implement distributed data storage for collaboration servers based on data categories. Furthermore, the networked environments discussed in FIG. 3 are for illustration purposes only. Embodiments are not limited to the example applications, modules, or processes.

Figure 4:
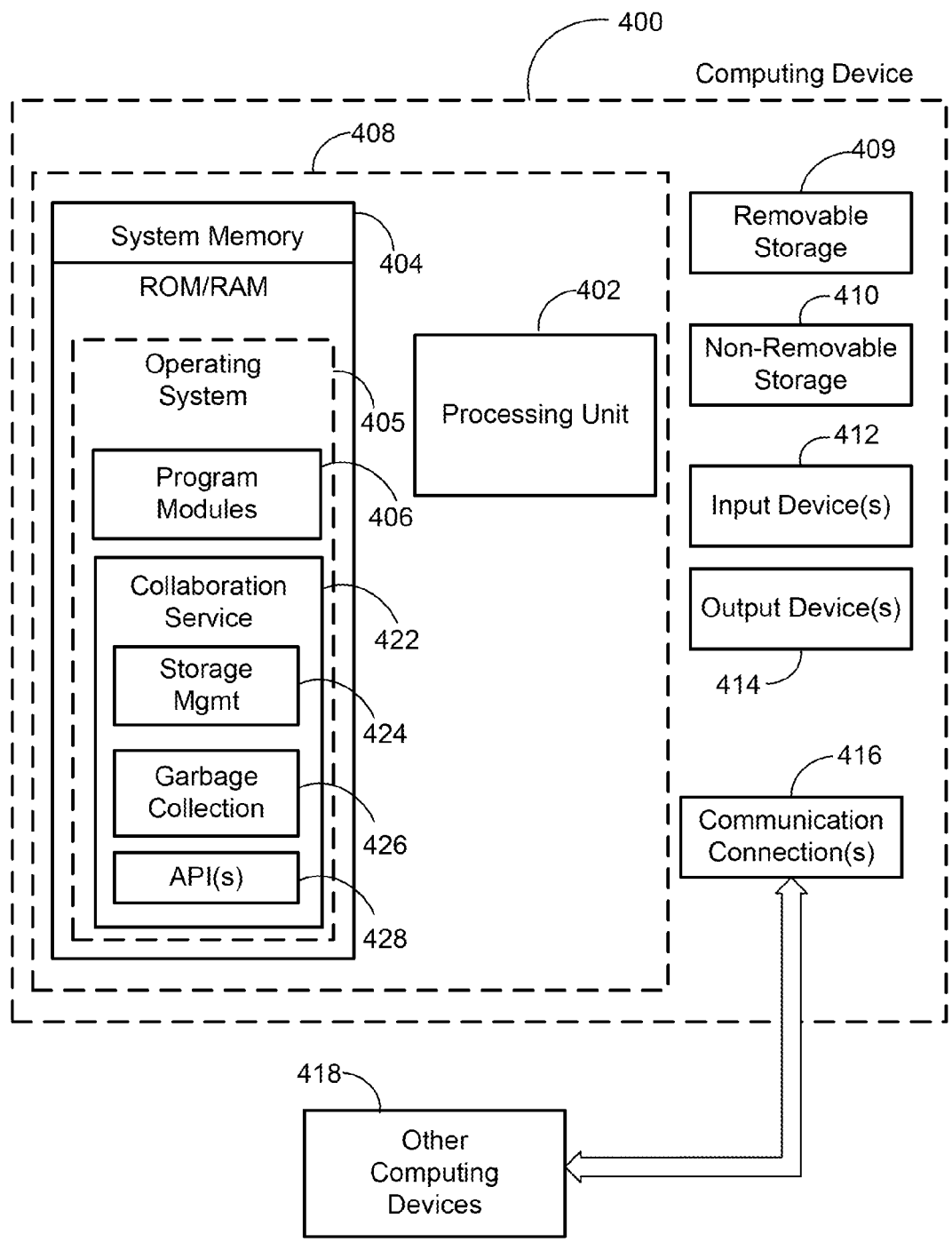
FIG. 4 is a block diagram of an example computing operating environment, where embodiments may be implemented.

FIG. 4 and the associated discussion are intended to provide a brief, general description of a suitable computing environment in which embodiments may be implemented. With reference to FIG. 4, a block diagram of an example computing operating environment is illustrated, such as computing device 400. In a basic configuration, the computing device 400 may be a server such as a collaboration server. Computing device 400 may typically include at least one processing unit 402 and system memory 404. Computing device 400 may also include a plurality of processing units that cooperate in executing programs. Depending on the exact configuration and type of computing device, the system memory 404 may be volatile (such as RAM), non-volatile (such as ROM, flash memory, etc.) or some combination of the two. System memory 404 typically includes an operating system 405 suitable for controlling the operation of a networked personal computer, such as the WINDOWS® operating systems from MICROSOFT CORPORATION of Redmond, Wash. The system memory 404 may also include one or more software applications such as program modules 406, collaboration service 422, storage management module or application 424, garbage collection module 426, and API(s) 428.

Collaboration service 422 is a hosted service providing participating users to access files and documents in a collaborative manner. The service may be implemented and managed by one or more servers. Storage management application (or module) 424 is an integral part of collaboration service 422 for managing the storage of received data in internal and external stores such that users can access, read, modify, delete the stored data. Storage management application 424 may store some of the data in external data stores through a storage provider as discussed above. To optimize external storage operations, a garbage collection module 426 may be used to manage deletions of data across the service (including internal and external data stores). Moreover, APIs 428 may be employed to interact with storage providers and users for determining categories of data, storing the data in internal or external data stores, and retrieving stored data upon request. This basic configuration is illustrated in FIG. 4 by those components within dashed line 408.

The computing device 400 may have additional features or functionality. For example, the computing device 400 may also include additional data storage devices (removable and/or non-removable) such as, for example, magnetic disks, optical disks, or tape. Such additional storage is illustrated in FIG. 4 by removable storage 409 and non-removable storage 410. Computer storage media may include volatile and non-volatile, removable and non-removable media implemented in any method or technology for storage of information, such as computer readable instructions, data structures, program modules, or other data. System memory 404, removable storage 409, and non-removable storage 410 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 400. Any such computer storage media may be part of device 400. Computing device 400 may also have input device(s) 412 such as keyboard, mouse, pen, voice input device, touch input device, etc. Output device(s) 414 such as a display, speakers, printer, etc. may also be included. These devices are well known in the art and need not be discussed at length here.

The computing device 400 may also contain communication connections 416 that allow the device to communicate with other computing devices 418, such as over a wireless network in a distributed computing environment, for example, an intranet or the Internet. Other computing devices 418 may include database servers, file servers, provider servers, and the like. Communication connection 416 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

The claimed subject matter also includes methods of operation. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be collocated with each other, but each can be only with a machine that performs a portion of the program.

Figure 5:
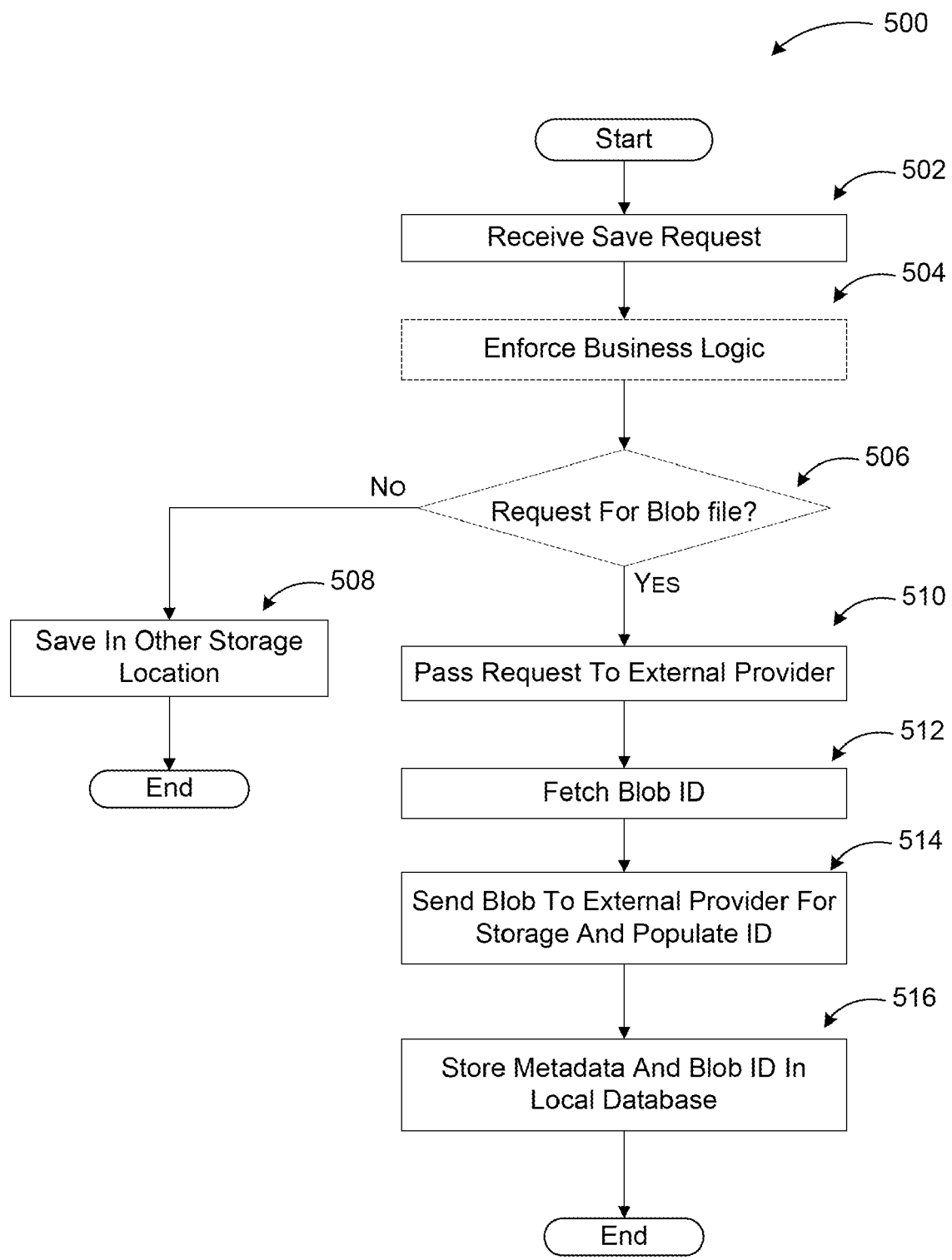
FIG. 5 illustrates a logic flow diagram of an example distributed storage process according to embodiments.

FIG. 5 illustrates a logic flow diagram of an example distributed storage process 500 according to embodiments. Process 500 may be implemented as part of a collaboration service.

Process 500 begins with operation 502, where a save request is received by a front-end web application. Processing advances from operation 502 to optional operation 504, where the application middle-tier logic may provide business logic validation, including antivirus checks, property promotion, rights management, and other pre-processing tasks. Processing continues to decision operation 506 from optional operation 504.

At decision operation 506, a determination is made whether the data to be stored is blob that can be stored in an external data store. According to some embodiments, all of part of the data may be stored externally depending on the determined category. If no portion of the data is to be stored externally, processing moves to operation 508, where all of the data is stored in an internal data store.

If at least a portion of the data to be stored is blob, processing advances from decision operation 506 to operation 510. At operation 510, the request is passed by the external storage provider interface to an external storage provider. Processing moves from operation 510 to operation 512.

At operation 512, a blob ID is received from the external blob storage provider by the external blob storage provider interface and passed on to a storage access stack of the system. Processing continues from operation 510 to operation 512.

At operation 512, the blob is sent to the external blob storage provider and a unique ID for the blob file is populated by the system associating the blob and its storage location with the unique identifier for subsequent retrieval. Processing continues to operation 516 from operation 514.

At operation 516, the metadata associated with the blob and the unique blob ID are stored in an internal data store (e.g. an SQL database) for reference by the system. After operation 522, processing moves to a calling process for further actions.

The operations included in process 500 are for illustration purposes. Providing distributed data storage for collaboration servers may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above.

Rather, the specific features and acts described above are disclosed as example forms of implementing the claims and embodiments.

What is claimed is:

1. A method to be executed at least in part in a computing device for managing distributed storage of data in a collaboration environment, the method comprising:
   receiving, at a collaboration server, data to be stored in a collaboration system;
   determining a category of the received data, wherein determining the category of the received data comprises determining that at least some of the received data is unstructured;
   separately determining, based on a parameter received from a storage provider managing an external data store, whether at least one portion of the received unstructured data is to be stored in the external data store;
   upon determining that no portion of the data is to be stored in the external data store:
   storing all of the data in an internal data store managed by the collaboration server;
   upon determining that the at least one portion of the received unstructured data is to be stored in the external data store:
   requesting an identifier generated by the storage provider managing the external data store;
   receiving the identifier from the storage provider, wherein the storage provider is different from the external data store;
   providing the at least one portion of the received unstructured data to the storage provider; and
   storing the identifier in the internal data store.

2. The method of claim 1, wherein the category of the recieved data is further determined based on at lest on pre-defines criterion from a set of: an access type of the data, whether a redundancy check is to be performed on stored data, a backup frequencey required for the data, an expected storage life for the stored data, a required security attribute for the stored data, a frequency of updates for the stored data, and an encryption status of the second data.

3. The method of claim 1, wherein the internal data store is for structured data and the external data store is for unstructured data.

4. The method of claim 1, further comprising:
   associating the received identifier with at least one other portion of the data stored in the internal data store before storing the identifier.

5. The method of claim 1, wherein the identifier is stored as metadata associated with at least one other portion of the data stored in the internal data.

6. The method of claim 1, wherein the identifier is generated by the external data store.

7. The method of claim 1, further comprising:
   managing a deletion of a portion of data in the collaboration system by employing one of: a lazy garbage collection algorithm, never deleting data from the external data store, and notifying the storage provider when the portion of the data is deleted.

8. The method of claim 7, wherein employing the lazy garbage collection algorithm comprises:
   enumerating all stored data in the external data store;
   enumerating all identifiers in the internal data store; and
   removing stored data in the external data store for which there is no corresponding identifier in the internal data store.

9. The method of claim 1, wherein the identifier is a unique identifier assigned to a portion of data stored in the external data store.

10. The method of claim 1, further comprising:
    receiving a request for data retrieval from a user;
    if a portion of the requested data is stored in the external data store, retrieving an identifier associated with the externally stored portion of the requested data from the internal data store;
    providing the retrieved identifier to the storage provider for retrieval of the externally stored portion of the data from the external data store;
    receiving the externally stored data; and
    providing the requested data to the user.

11. The method of claim 10, further comprising:
    if another portion of the data is stored in the internal data store, integrating the externally stored portion of the data with the internally stored portion of the data prior to providing the requested data to the user.

12. A system for managing distributed storage of data in a collaboration environment, the system comprising:
    a collaboration server configured to:
    receive data to be stored by the system;
    determine whether a portion of the received data is unstructured;
    when no portion of the received data is unstructured designate all of the received data to be stored internally;
    when a portion of the received data is unstructured, separately determine, based on a parameter received from a storage provider managing an external data store, that at least one portion of the received unstructured data is to be stored externally;
    notify the storage provider managing an external data store about the at least one portion of the unstructured data to be stored externally, wherein the storage provider is different from the external data store;
    receive a unique identifier from the storage provider;
    associate the unique identifier with the structured portion of the data;
    provide the at least one portion of the unstructured data to the storage provider for storage in the external data store;
    an internal data store, operatively connected to and managed by the collaboration server, for storing the structured portion of the data designated to be stored internally and the received unique identifier associated with the externally stored at least one portion of the unstructured data;
    the external data store, operatively connected to the storage provider and configured to store the at least one portion of the unstructured data designated to be stored externally; and
    the storage provider, operatively connected to the external data store and the collaboration server and configured to:
    receive notification from the collaboration server about the at least one portion of the unstructured data to be stored externally;
    provide the unique identifier to the collaboration server;
    receive the at least one portion of the unstructured data for storage in the external data store;
    enumerate all stored data in the external data store;
    enumerate all identifiers in the internal data store; and
    remove stored data in the external data store for which there is no corresponding identifier in the internal data store.

13. The system of claim 12, wherein the collaboration server is further configured to:
    receive a request for retrieving the stored data from a user;

retrieve the unique identifier associated with the externally stored unstructured portion of the data from the internal data store;

provide the unique identifier to the storage provider for retrieval of the unstructured data from the external data store;

receive the unstructured portion of the data;

retrieve the structured portion of the data from the internal data store;

integrate the structured and unstructured portions of the data; and provide the stored data to the user, wherein the retrieval of the unstructured data from the external data store and the integration of the portions of the data is transparent to the user.

14. The system of claim 12, further comprising:

a storage provider interface configured to:

communicate with the storage provider for exchanging the unique identifier and the externally stored portion of the data.

15. The system of claim 14, wherein the storage provider interface is an unmanaged Application Programming Interface (API).

16. The system of claim 12, wherein the collaboration server is further configured to:

manage at least one of: a quota and an object level administration for the distributed storage of the received data.

17. A computer-readable storage medium with instructions encoded thereon for managing distributed storage of data in a collaboration system, the instructions comprising:

receiving data to be stored by the collaboration system;

determining a first category of a first part of the received data, wherein determining the first category of the first part of the received data comprises determining that the first part of the received data is unstructured;

determining a second category of a second part of the received data, wherein determining the second category of the second part of the received data comprises determining that the second part of the received data comprises at least one of: encrypted data, frequently updated data, and data with increased security;

separately determining, based on a parameter received from a storage provider managing an external data store, that at least a first portion of the first part of the received data is to be stored in the external data store and that at least a second portion of the second part of the received data is to be stored in the external store;

requesting a first unique identifier indicating a first location of the first portion of the first part of the received data in the external data store and a second unique identifier indicating a second location of the second portion of the second part of the received data in the external data store from a storage provider interface communicating with the storage provider managing the external data store, wherein the storage provider is different from the external data store;

receiving the first unique identifier and the second unique identifier from the storage provider;

providing the first portion of the first part of the received data and the second portion of the second part of the received data to the external data store through storage provider interface;

associating the first unique identifier and the second unique identifier with a third part of the received data to be stored internally; and storing the first unique identifier and the second unique identifier in the internal data store.

18. The computer-readable storage medium of claim 17, wherein the instructions further comprise:

receiving a request for data retrieval from a user;

retrieving the first unique identifier associated with the externally stored first portion of the first part of the received data and the second unique identifier associated with the second portion of the second part of the received data from the internal data store;

providing the retrieved first unique identifier and the retrieved second unique identifier to the storage provider interface;

receiving the externally stored data;

integrating the externally stored data with the internally stored portion of the data; and providing the requested data to the user.

* * * * *